US012535207B1

(12) United States Patent
Han

(10) Patent No.: US 12,535,207 B1
(45) Date of Patent: Jan. 27, 2026

(54) RGB OUTDOOR WATERPROOF LIGHT SOURCE

(71) Applicant: Dongguan Lixing Lighting Co., Ltd., Dongguan (CN)

(72) Inventor: Xiao Han, Dongguan (CN)

(73) Assignee: Dongguan Lixing Lighting Co., Ltd., Dongguan (CN)

( * ) Notice: Subject to any disclaimer, the term of this patent is extended or adjusted under 35 U.S.C. 154(b) by 0 days.

(21) Appl. No.: 19/272,801

(22) Filed: Jul. 17, 2025

(51) Int. Cl.

| | |
|---|---|
| ***F21V 31/00*** | (2006.01) |
| ***F21V 15/01*** | (2006.01) |
| ***F21V 17/00*** | (2006.01) |
| ***F21V 23/00*** | (2015.01) |
| *F21W 131/10* | (2006.01) |

(52) U.S. Cl.
CPC ............ *F21V 31/005* (2013.01); *F21V 15/01* (2013.01); *F21V 17/005* (2013.01); *F21V 23/002* (2013.01); *F21W 2131/10* (2013.01)

(58) Field of Classification Search
CPC ...... F21V 23/002; F21V 17/005; F21V 15/01; F21V 31/005
See application file for complete search history.

(56) References Cited

U.S. PATENT DOCUMENTS

| | | | | |
|---|---|---|---|---|
| 11,708,964 | B2 * | 7/2023 | Krieger | F21V 23/06 362/249.06 |
| 12,013,104 | B2 * | 6/2024 | Dai | H05B 45/10 |
| 12,196,400 | B1 * | 1/2025 | Niu | F21V 17/005 |
| D1,072,285 | S * | 4/2025 | Wang | D26/25 |
| D1,085,478 | S * | 7/2025 | Han | D26/1 |
| 2004/0115984 | A1 * | 6/2004 | Rudy | F21S 4/10 439/405 |
| 2006/0197474 | A1 * | 9/2006 | Olsen | H05B 47/22 315/312 |
| 2009/0147509 | A1 * | 6/2009 | Reed | F21V 21/002 362/418 |
| 2011/0194292 | A1 * | 8/2011 | Tsai | F21S 4/10 362/231 |
| 2024/0035652 | A1 * | 2/2024 | Dai | H05B 45/325 |

FOREIGN PATENT DOCUMENTS

| | | | |
|---|---|---|---|
| CN | 207555449 U | | 6/2018 |
| CN | 220397472 U | | 1/2024 |
| CN | 221705332 U | * | 9/2024 |
| CN | 119914871 A | | 5/2025 |

OTHER PUBLICATIONS

Machine translation of CN-221705332-U (Year: 2024).*

* cited by examiner

*Primary Examiner* — Leah Macchiarolo
(74) *Attorney, Agent, or Firm* — Nitin Kaushik

(57) ABSTRACT

An RGB outdoor waterproof light source includes a top cover, a bottom cover and a lamp panel. The bottom cover is provided with a mounting groove. The lamp panel is fixedly mounted in the mounting groove. Power lines are arranged at two ends of the lamp panel, respectively. Receiving grooves are formed in two ends of the bottom cover. The top cover is provided with a chamber. Press-fit grooves are formed in two ends of the top cover. At least two rows of partitions are arranged in the press-fit grooves, and at least two rows of partitions are arranged the receiving grooves. Jaws are arranged on the partitions. After the top cover and the bottom cover are pressed together, the wires are squeezed by means of an interference amount caused by an inward deflection of the contour of wires to fill in a gap to realize sealing.

5 Claims, 5 Drawing Sheets

RGB OUTDOOR WATERPROOF LIGHT SOURCE

TECHNICAL FIELD

The invention relates to the technical field of industrial outdoor light sources, in particular to an RGB outdoor waterproof light source.

BACKGROUND

It is commonly known that an RGB light source, as a common light source, is able to emit light in multiple colors and is widely used for decoration, particularly outdoor decoration. Because electronic components, that are easily short-circuited and burnt down in presence of water, are configured in the RGB light source, the RGB light source, when applied to outdoor decorative lamps, should be waterproof to satisfy outdoor usage requirements.

At present, two techniques are adopted to guarantee the waterproofness of the RGB light source: one of the techniques is to wrap all circuit wires in a colloid by glue sealing, and the other technique is to squeeze circuit wires by means of protrusions at wire outlets of an upper shell and a lower shell to fulfill a sealing effect.

The glue sealing technique has the defects that the process is complex, the cost is high, an environmentally-friendly glue needs to be adopted, and the requirements are high. As for the sealing technique based on the protrusions at the wire outlets, the protrusions are in contact with the wires to squeeze the wires by shear force, which will severely damage the wires; and due to the decrease in the contact surface after the wires are pressed by the protrusions, the overall weatherability is poor.

SUMMARY

In view of the abovementioned defects in the prior art, the objective of the invention is to provide an RGB outdoor waterproof light source, which has a simple assembly process, little damage to wires and good waterproofness.

To fulfill the above objective, the invention adopts the following technical solution:

An RGB outdoor waterproof light source includes a top cover, a bottom cover and a lamp panel. The bottom cover is provided with a mounting groove for mounting the lamp panel. The lamp panel is fixedly mounted in the mounting groove. Power lines are arranged at two ends of the lamp panel, respectively. Receiving grooves are formed in two ends of the bottom cover, respectively. The receiving grooves are connected to the mounting groove. The top cover is provided with a chamber, which is pressed onto the bottom cover and wraps the mounting groove. Press-fit grooves connected to the chamber are formed in two ends of the top cover, respectively. At least two rows of partitions are arranged in the press-fit grooves, and at least two rows of partitions are arranged the receiving grooves. Jaws corresponding to the power lines in shape are arranged on the partitions. The partitions in the press-fit grooves are opposite to the partitions in the receiving grooves. After the top cover is pressed onto the bottom cover, jaws of the press-fit grooves and jaws of the receiving grooves form a wiring channel.

Wherein, the power lines are arranged in the wiring channel and fill in the wiring channel by means of a pressing force between the press-fit grooves and the receiving grooves.

Preferably, an interference amount between the wiring channel and the power lines is 0.1-0.3 mm.

Preferably, the lamp panel is provided with at least one bead towards the top cover, and the top cover is provided with a diffuser located above the lamp bead.

Preferably, the diffuser and the top cover are formed integrally.

Preferably, insertion pillars and insertion holes are arranged between the press-fit grooves and the receiving grooves, and when the top cover is pressed onto the bottom cover, the insertion pillars are squeezed to be inserted into the insertion holes.

By adopting the above technical solution, the RGB outdoor waterproof light source is formed by the top cover, the bottom cover and the lamp panel, a sealed chamber is defined by the top cover, the bottom cover and wires of the power lines to protect the lamp panel, such that the number of parts is effectively reduced, and the structure is simplified; wherein, after the top cover and the bottom cover are pressed together, the wires are squeezed by means of an interference amount caused by an inward deflection of the contour of the wires to fill in a gap to realize sealing. In addition, the top cover and the diffuser in the middle are formed integrally, such that the assembly clearance is reduced, the sealing performance is improved, and a desired light spot is guaranteed.

DETAILED DESCRIPTION OF THE EMBODIMENTS

To better clarify the objectives, technical solutions and advantages of the invention, the invention is described in further detail below in conjunction with accompanying drawings and embodiments. It should be understood that the specific embodiments described here are merely used for explaining the invention rather than limiting the invention.

In the description of the invention, it should be understood that terms such as “central”, “longitudinal”, “transverse”, “length”, “width”, “thickness”, “upper”, “lower”, “front”, “back”, “left”, “right”, “vertical”, “horizontal”, “top”, “bottom”, “inner”, “outer”, “clockwise” and “anticlockwise” are used to indicate directional or positional relations based on accompanying drawings merely for the purpose of facilitating and simplifying the description of the invention, do not indicate or imply that devices or elements referred to must be in a specific direction or be configured and operated in a specific direction, and thus should not be construed as limitations of the invention. In addition, terms such as “first” and “second” are merely for the purpose of description and should not be construed as indicating or implying relative importance or implicitly indicating the number of technical features referred to. Therefore, a feature defined by “first” or “second” should be explicitly or implicitly indicate the inclusion of one or more said features. In the description of the invention, “multiple” refers to two or more, unless otherwise expressly defined.

In the description of the invention, it should be noted that unless otherwise expressly stated and defined, terms “mount”, “link” and “connect” should be understood in a broad sense. For example, “connect” may refer to fixed connection, detachable connection or integrated connection; or, mechanical connection or electrical connection; or, direct connection, indirect connection by means of an intermediate medium, internal communication or interaction of two elements. Those ordinarily skilled in the art may appreciate the specific meaning of these terms in the invention according to specific circumstances.

Figure 1:
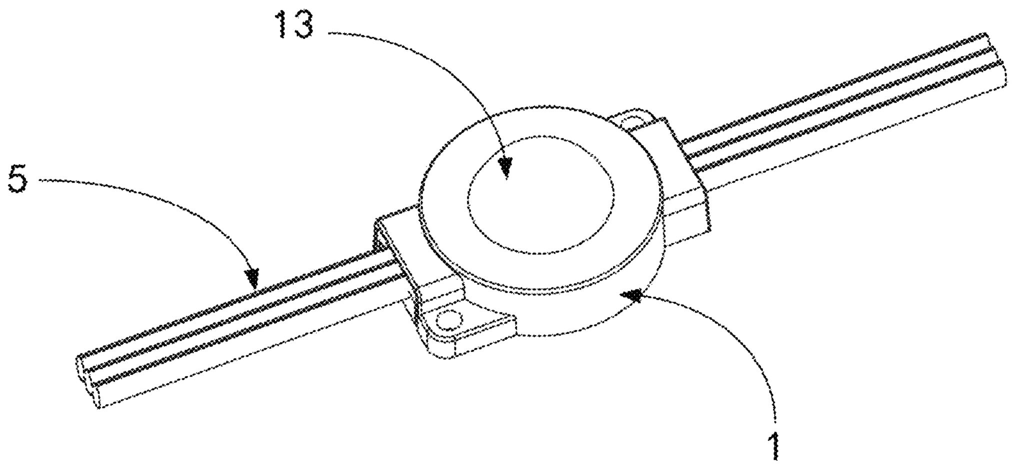
FIG. 1 is a schematic structural diagram according to an embodiment of the invention.
Figure 2:
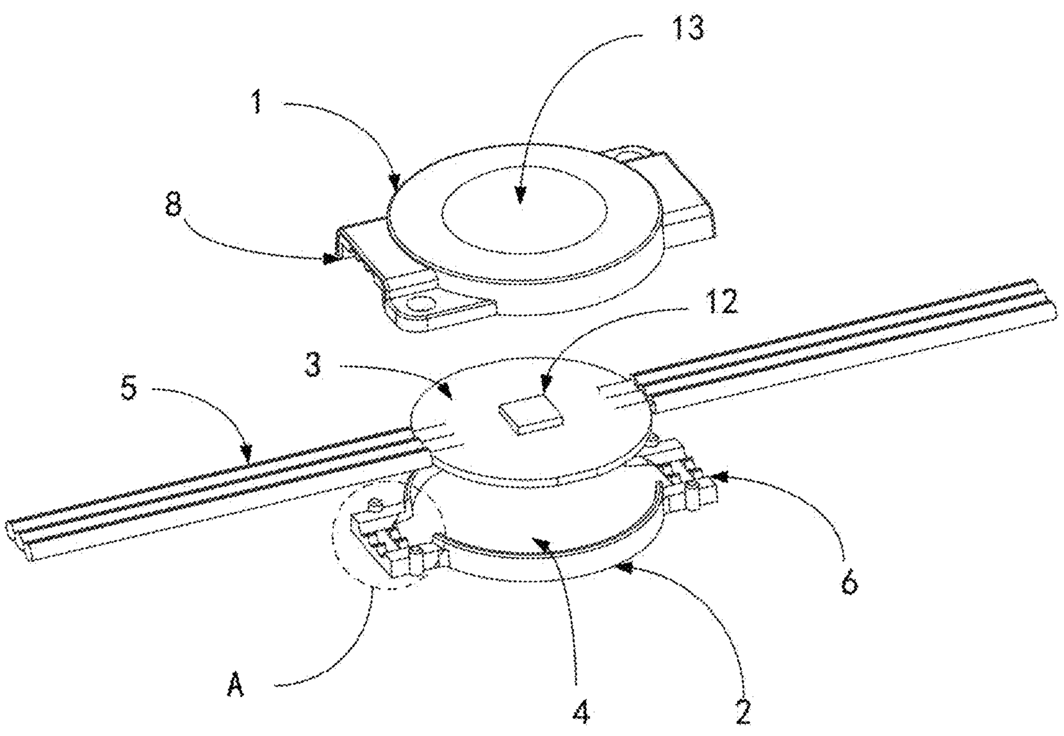
FIG. 2 is an exploded structural view according to an embodiment of the invention.
Figure 3:
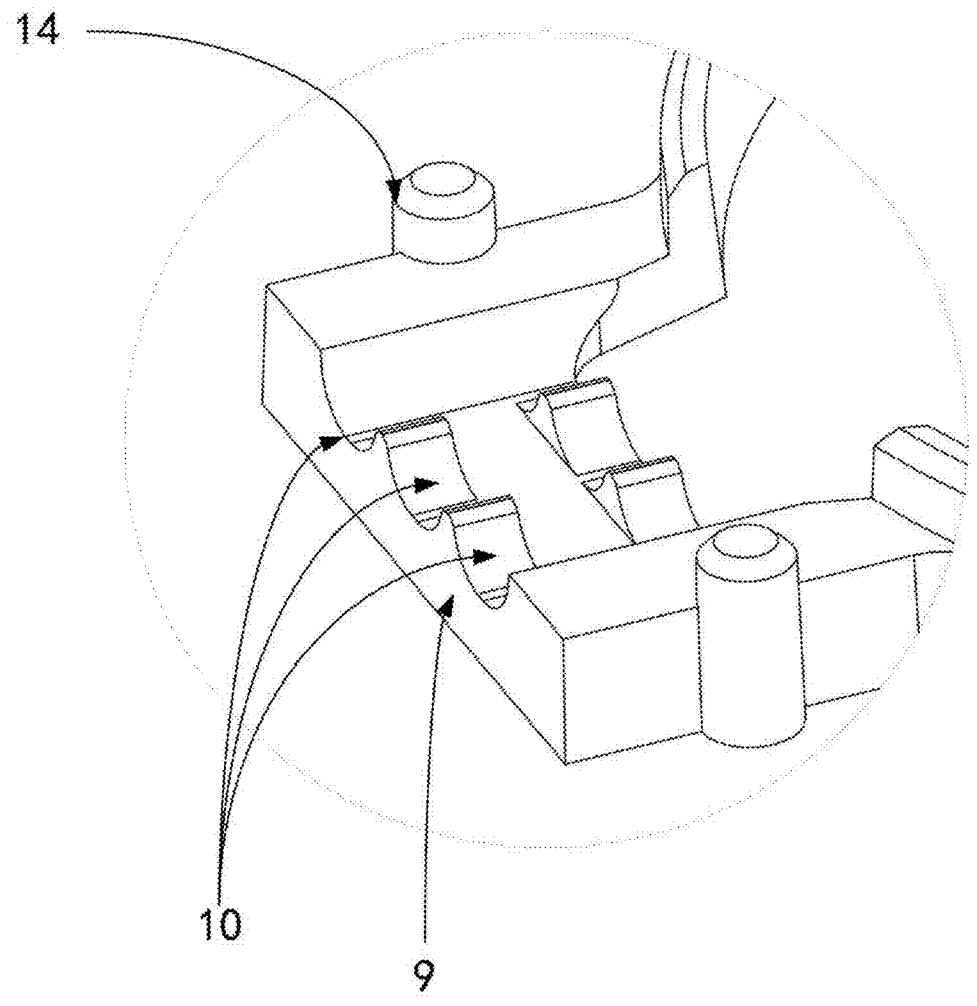
FIG. 3 is an enlarged structural view of part Ain FIG. 2 according to an embodiment of the invention.
Figure 4:
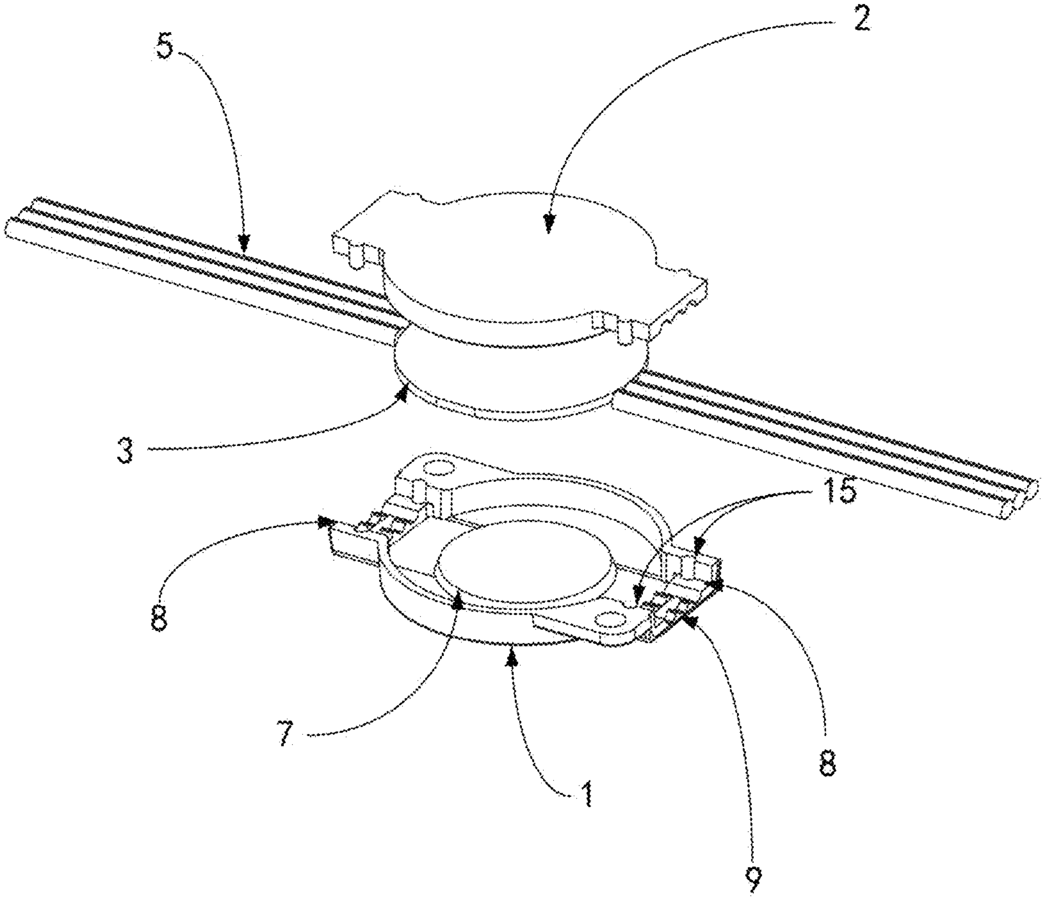
FIG. 4 is an exploded structural view in another direction according to an embodiment of the invention.
Figure 5:
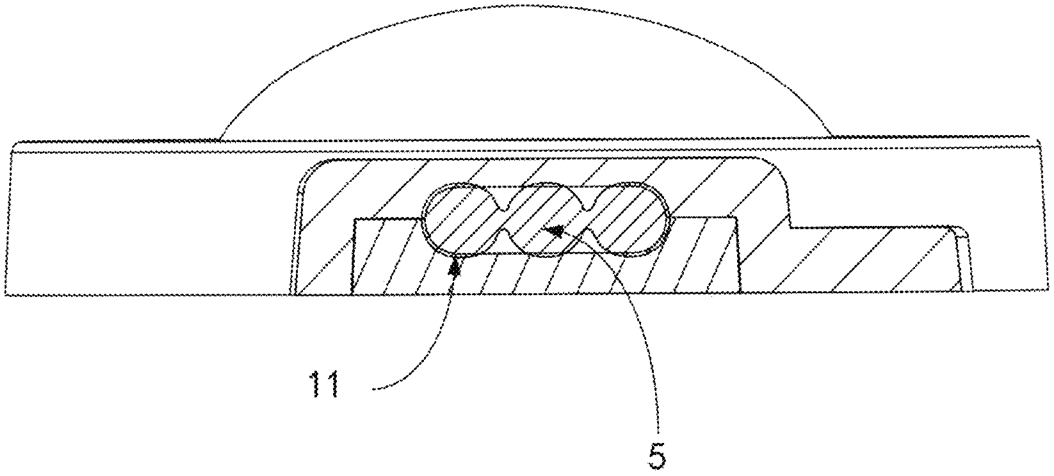
FIG. 5 is a sectional structural view at the position of a partition according to an embodiment of the invention.

As shown in FIGS. 1-5, an embodiment of the invention provides a RGB outdoor waterproof light source, including a top cover 1, a bottom cover 2 and a lamp panel 3. The bottom cover 2 is provided with a mounting groove 4 for mounting the lamp panel 3. The lamp panel 3 is fixedly mounted in the mounting groove 4. Power lines 5 are arranged at two ends of the lamp panel 3, respectively. Receiving grooves 6 are formed in two ends of the bottom cover 2, respectively. The receiving grooves 6 are connected to the mounting groove 4. The top cover 1 is provided with a chamber 7, which is pressed onto the bottom cover 2 and wraps the mounting groove 4. Press-fit grooves 8 connected to the chamber 7 are formed in two ends of the top cover 1, respectively. At least two rows of partitions 9 are arranged in the press-fit grooves 8, and at least two rows of partitions 9 are arranged in the receiving grooves 6. The partitions 9 are provided with jaws 10 corresponding to the power lines 5 in shape. The partitions 9 in the press-fit grooves 8 are opposite to the partitions 9 in the receiving grooves 6. After the top cover 1 is pressed onto the bottom cover 2, a wiring channel 11 is formed by jaws of the press-fit grooves 8 and jaws 10 of the receiving grooves 6.

Wherein, the power lines 5 are arranged in the wiring channel 11, and flexible wires of the power lines 5 fill in the wiring channel 11 by means of a pressing force between the press-fit grooves 8 and the receiving grooves 6.

The main innovation of this embodiment is as follows: the RGB outdoor waterproof light source is formed by the top cover 1, the bottom cover 2 and the lamp panel 3, and a sealed chamber is defined by the top cover 1, the bottom cover 2 and the power lines 5 to protect the lamp panel 3, such that the number of components is effectively reduced, and the structure is simplified. Wherein, after the top cover 1 and the bottom cover 2 are pressed together, the wires are squeezed by means of an interference amount caused by an inward deflection of the contour of the wires to fill in a gap to realize sealing.

To gain a better understanding of the structural principle of this embodiment, the assembly of the RGB outdoor waterproof light source is explained as follows:

When the RGB outdoor waterproof light source is assembled, first, the lamp panel 3 is fixed in the mounting groove 4 of the bottom cover 2, wherein the shape of the mounting groove 4 corresponds to the shape of the lamp panel 3, for example, if the lamp panel 3 is circular, and the mounting groove 4 may also be designed to be circular; after the lamp panel 3 is mounted, the positions of the power lines 5 need to be adjusted, so the wires of the power lines 5 are placed on the partitions 9 in the receiving grooves 6, located in the jaws 10 and kept stationary; then, the top cover 1 is pressed onto the bottom cover 2; in the pressing process, an opening of the mounting groove 4 is gradually squeezed into the chamber 7, and an edge of the mounting groove 4 is in close fit with a wall of the chamber 7 to realize sealing; and similarly, in the pressing process, openings of the receiving grooves 6 are gradually squeezed into the into the press-fit grooves 8, edges of the receiving grooves 6 are in close fit with walls of the press-fit grooves 8 to realize sealing. The partitions 9 in the press-fit grooves 8 abut against the partitions 9 in the receiving grooves 6, and the jaws 10 are assembled together to form the wiring channel 11; when the jaws 10 are assembled, the wires of the power lines 5 are squeezed; the wires, also referred to as a soft colloid, fill in the wiring channel 11 in the squeezing process, the wires of the power lines 5 partially expand inwards and outwards and then fill in the space between the partitions 9; and after the space between the partitions 9 are filled, the wires themselves may function as sealing elements. In the whole assembly process, glue filling may be eliminated; and compared with the method of squeezing wires by means of protrusions, damage to the wires may be reduced.

Further, in this embodiment, an interference amount between the wiring channel 11 and the power lines 5 is 0.1-0.3 mm. It may be understood that the inner diameter of the wiring channel 11 is 0.1-0.3 mm less than the diameter of the wires of the power lines 5. According to different overall sizes of components, the interference will change accordingly. Only a conventional range is provided in this embodiment.

Further, for light guide, in this embodiment, the lamp panel 3 is provided with at least one bead 12 towards the top cover 1, the top cover 1 is provided with a diffuser 13 located above the bead 12, and the diffuser 13 and the top cover 1 are formed integrally. By integrally forming the top cover 1 and the diffuser 13 in the middle, the assembly clearance may be reduced under the condition of guaranteeing a desired light spot, and the sealing performance is improved.

Further, to better press and fasten the press-fit grooves 8 and the receiving grooves 6, in this embodiment, insertion pillars 14 and insertion holes 15 are arranged between the press-fit grooves 8 and the receiving grooves 6. When the top cover 1 is pressed onto the bottom cover 2, the insertion pillars 14 are squeezed to be inserted into the insertion holes 15 to improve the locking force.

The above embodiments are merely preferred ones of the invention and are not intended to limit the patent scope of the invention. All equivalent structural or flow transformations made according to the description and accompanying drawings of the invention, or direct or indirect applications to other related technical fields should also fall within the patent protection scope of the invention.

What is claimed is:

1. An RGB outdoor waterproof light source, comprising a top cover, a bottom cover and a lamp panel, wherein the bottom cover is provided with a mounting groove for mounting the lamp panel; the lamp panel is fixedly mounted in the mounting groove; power lines are arranged at two ends of the lamp panel, respectively; receiving grooves are formed in two ends of the bottom cover, respectively; the receiving grooves are connected to the mounting groove; the top cover is provided with a chamber, which is pressed onto the bottom cover and wraps the mounting groove; press-fit grooves connected to the chamber are formed in two ends of the top cover, respectively; at least two rows of partitions are arranged in the press-fit grooves, and at least two rows of partitions are arranged in the receiving grooves; jaws corresponding to the power lines in shape are arranged on the partitions; the partitions in the press-fit grooves are opposite to the partitions in the receiving grooves; and after the top cover is pressed onto the bottom cover, jaws of the press-fit grooves and jaws of the receiving grooves form a wiring channel;

wherein, the power lines are arranged in the wiring channel and fill in the wiring channel by means of a pressing force between the press-fit grooves and the receiving grooves;

the top cover is pressed onto the bottom cover; in the pressing process, an opening of the mounting groove is gradually squeezed into the chamber, and an edge of the mounting groove is in close fit with a wall of the chamber to realize sealing.

2. The RGB outdoor waterproof light source according to claim 1, wherein an interference amount between the wiring channel and the power lines is 0.1-0.3 mm.

3. The RGB outdoor waterproof light source according to claim 1, wherein the lamp panel is provided with at least one lamp bead towards the top cover, and the top cover is provided with a diffuser located above the at least one lamp bead.

4. The RGB outdoor waterproof light source according to claim 3, wherein the diffuser and the top cover are formed integrally.

5. The RGB outdoor waterproof light source according to claim 1, wherein insertion pillars and insertion holes are arranged between the press-fit grooves and the receiving grooves, and when the top cover is pressed onto the bottom cover, the insertion pillars are squeezed to be inserted into the insertion holes.

* * * * *